Jan. 21, 1964     L. L. GENUIT     3,119,058
CONTROLLED RECTIFIER INVERTER CIRCUITS
Filed Feb. 1, 1960     2 Sheets-Sheet 1

INSTANTANEOUS VOLTAGE ACROSS
CONTROLLED RECTIFIER-11

INSTANTANEOUS VOLTAGE ACROSS
CONTROLLED RECTIFIER-12

LOAD VOLTAGE

Inventor:
Luther L. Genuit,
by Henry J. Mercenich
Attorney.

United States Patent Office 3,119,058
Patented Jan. 21, 1964

3,119,058
CONTROLLED RECTIFIER INVERTER CIRCUITS
Luther L. Genuit, Danville, Ill., assignor to General
Electric Company, a corporation of New York
Filed Feb. 1, 1960, Ser. No. 5,727
11 Claims. (Cl. 321—45)

This invention relates to inverter circuits for converting direct current into alternating current. More particularly, it relates to improved series inverter circuits employing semiconductive controlled rectifiers.

An inverter circuit of the type to which this invention is applicable is described in the copending application Serial Number 855,439, now Patent No. 3,047,789, filed in the name of Hugh R. Lowry, entitled "Inverter Circuit" and assigned to the same assignee as the present invention. Essentially, the inverter circuit comprises two serially connected capacitors and two serially connected semiconductive controlled rectifiers connected across a pair of direct current input terminal connections, each controlled rectifier being driven by a unijunction trantransistor of a relaxation oscillator. Such inverter circuits can be used in power supply systems for the operation of fluorescent lamps at frequencies above a thousand cycles per second. Also, the output of such inverter circuits can be rectified and used to provide an economical high voltage direct current supply.

Controlled rectifiers such as silicon controlled rectifiers have much higher average volt-ampere ratings than presently available semiconductor power transistors and in some respects are similar to thyratron tubes. The emitter and collector electrodes are similar to the cathode and anode of the thyratron. Further, the gate electrode of the controlled rectifier corresponds somewhat to the control grid of the thyratron. However, the silicon controlled rectifier has an average forward voltage drop which may be only one tenth of the average voltage drop in a thyratron and has a recovery time which is appreciably less than the deionization time of a thyratron. The lower forward voltage drop allows the controlled rectifier to handle high currents with less loss. The lower recovery time of a semiconductive controlled rectifier permits the controlled rectifier to be switched on and off at a greater frequency. For example, at anode-to-cathode voltages less than the breakover voltage, the silicon controlled rectifier can be switched into a high conduction state by a 10 microsecond gate pulse with an amplitude of amount 1.5 volts and 30 milliamperes.

Since the breakover voltage and the reverse breakdown voltage of a controlled rectifier is lower than in a thyratron, circuit transients present a problem in circuits employing controlled rectifiers that is not usually encountered in thyratron circuits. If a transient voltage appears at the anode of a controlled rectifier which is in a blocking condition, it may cause the controlled rectifier to turn on while the other controlled rectifier is turned on and may result in the destruction of the rectifiers. Thus, it will be seen that more stringent requirements are imposed on circuits employing controlled rectifiers.

Further, the triggering requirements of a controlled rectifier differ from those of the thyratron. The gate current requirements for firing a silicon controlled rectifier decrease substantially as the junction temperature of the rectifier increases and also the gate current requirements decrease slightly as the anode-to-cathode voltage is increased. In view of these effects on the control characteristics, it is desirable to fire a silicon controlled rectifier with a gate current having a steep waveform where precise timing is required.

The inverter circuits with which this invention is concerned are characterized by one or more capacitors that are alternately charged and discharged into the load by a pair of controlled rectifiers. The controlled rectifiers are fired at precise intervals by relaxation oscillator circuits. In such firing circuits, a fixed time delay is provided by selecting a suitable RC (denoting ohmic resistance and capacitance) time constant. This time delay must take into account the recovery time or commutation period of the controlled rectifier. The recovery time or commutation period is the time required for a controlled rectifier which was previously switched on to return to a blocking state. In other words, it is the time required for the gate electrode of the rectifier to regain control after the forward current has been interrupted. For a silicon controlled rectifier of the type employed in the hereinafter described exemplifications of the invention, the commutation period should be about 20 microseconds.

A fixed time delay does not, however, positively insure that one controlled rectifier will be cut off before the charging period of the second controlled rectifier is initiated. It is therefore desirable that the inverter circuit positively require that one controlled rectifier be cut off before the charging period can be initiated for firing the second controlled rectifier.

Further, it is desirable that inverter circuits be capable of starting when the Q (denoting the ratio of the reactance to the effective resistance) of the load circuit is relatively low. In application of the inverter circuit to fluorescent lighting systems, the Q of the load circuit during starting may be considerably less than during the running condition since during the starting condition the fluorescent lamps are not ionized and only the lamp filaments in effect comprise the resistive load.

Accordingly, a general object of the invention is to provide an improved controlled rectifier inverter circuit for producing an alternating current output from a direct current supply.

It is another object of the invention to provide a controlled rectifier inverter circuit that positively requires that one controlled rectifier be cut off before the charging period can be initiated for firing a second controlled rectifier.

A further object of the invention is to provide a controlled rectifier inverter circuit in which transient voltages will not cause the firing circuit to trigger the controlled rectifiers.

Still another object of the present invention is to provide a controlled rectifier inverter circuit capable of starting when the circuit Q is relatively low.

In its broader aspects, the present invention comprises an inverter circuit in which a first and a second controlled rectifier are connected in circuit with a first and second firing circuit wherein the voltage across the first controlled rectifier during its commutation period is used to energize the first firing circuit which, after a predetermined delay sufficient to allow the first controlled rectifier to return to a blocking state, triggers the second controlled rectifier. Similarly, the voltage across the second controlled rectifier during its commutation period is utilized to energize the second firing circuit which, after a predetermined delay sufficient to allow the second controlled rectifier to return to a blocking state, triggers the first controlled rectifier.

In accordance with the invention, an inverter circuit is provided in which one or more capacitors are alternately charged and discharged by a first and a second semiconductive controlled rectifier, the gates of which are coupled by means of a transformer with a pair of relaxation oscillators that trigger the controlled rectifiers. The relaxation oscillators are connected in the circuit so that no current flows in the oscillator unless a reverse voltage appears across one of the controlled rectifiers. Since the reverse voltage appears only during commutation, the inverter circuit positively requires that one controlled rectifier be cut off before the charging period can be initiated for firing the second controlled rectifier.

According to another aspect of the invention, an auxiliary direct current source is connected in circuit to supply an initial charge to the main inverter capacitor or capacitors. On the closing of the starting switch, this capacitor voltage appears as a reverse voltage across one of the controlled rectifiers and hence excites the associated relaxation oscillator to initiate the operation of the inverter. Thereafter, the auxiliary direct current source becomes inoperative in the inverter circuit. Preferably, the voltage of the auxiliary source should be equal to the maximum commutation voltage appearing across the first controlled rectifier during normal operation of the circuit.

The subject matter which I regard as my invention is set forth in the appended claims. The invention itself, however, together with further objects and advantages thereof may be understood by referring to the following description taken in connection with the accompanying drawings in which:

Figure 1:
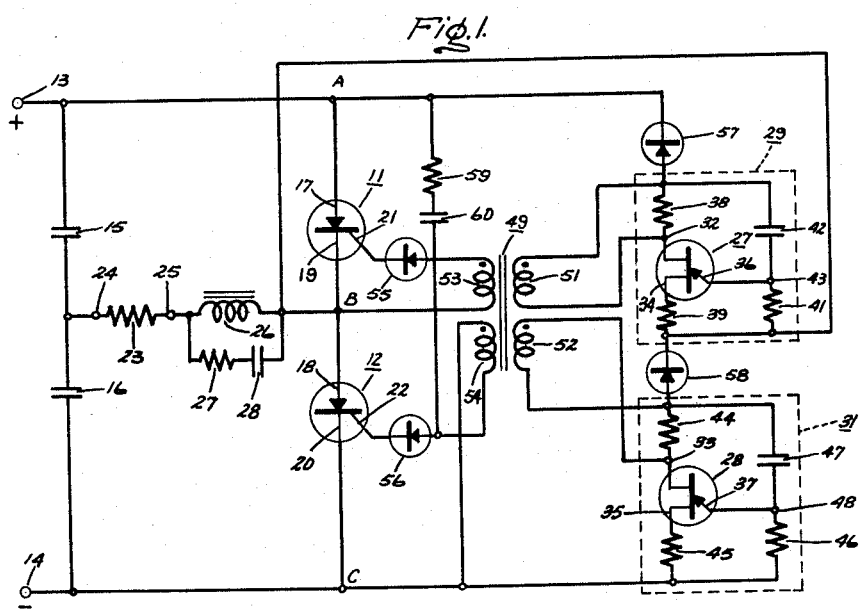
FIG. 1 is a schematic circuit diagram of a semiconductive controlled rectifier inverter circuit in which the invention is embodied.
Figure 4:
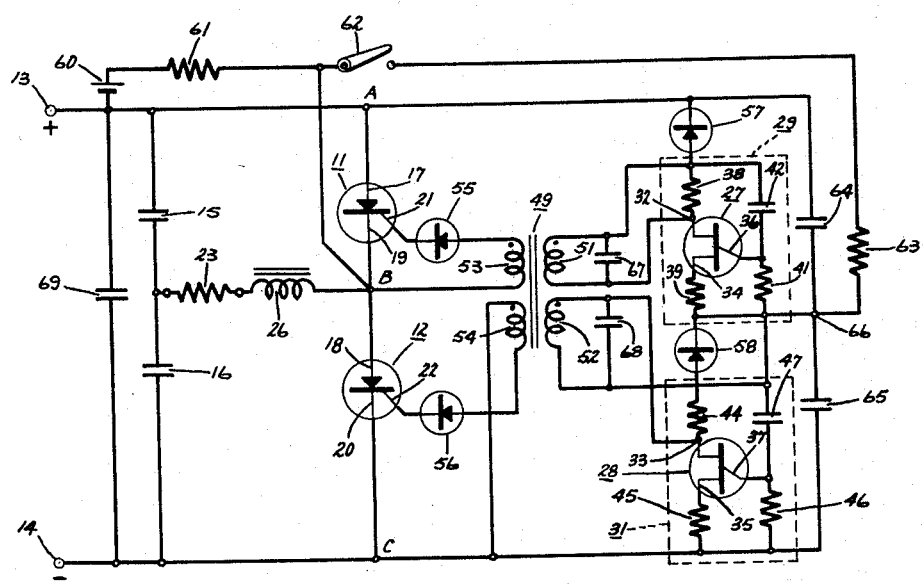
FIG. 4 is a schematic circuit diagram of a semiconductive controlled rectifier inverter circuit illustrating another embodiment of the invention.

In the inverter circuits illustrated in FIGS. 1 and 4, like reference numbers designate corresponding elements in both figures. The inverter circuits include two controlled rectifiers 11, 12, which may be any suitable type of semiconductive controlled rectifier having an adequate current carrying capacity. In the hereinafter described exemplifications of the invention, silicon controlled rectifiers are used. The two controlled rectifiers 11, 12 are connected in series across a pair of direct current input terminals 13, 14. The positive terminal 13 and the negative terminal 14, which is considered as the ground connection, are connected to a direct current supply source (not shown) which may be a rectified commercial alternating current source.

The controlled rectifiers 11, 12 are PNPN junction semiconductors, each having three terminals, the anodes 17, 18, cathodes 19, 20 and gates 21, 22, respectively. It is to be understood that the controlled rectifiers 11, 12 can be switched into a high conduction state at an anode-to-cathode voltage less than the breakover voltage by supplying a low level gate-to-cathode current. This characteristic permits the controlled rectifiers 11, 12 to be used to control a substantially large current flow by a low power signal supplied to the gate electrodes 21, 22.

At point A, the anode 17 of the controlled rectifier 11 is connected in circuit with the positive input terminal 13. The cathode 19 of controlled rectifier 11 and the anode 18 of the controlled rectifier 12 are connected at point B with an inductor 26. At point C, the cathode 20 of the controlled rectifier 12 is connected in circuit with the negative input terminal 14.

A pair of serially connected power capacitors 15, 16 are connected across the direct current input terminals 13, 14. It will be appreciated that the circuit of the invention can be operated with only one of the capacitors 15, 16. However, when only a single capacitor is used in an inverter of the same power rating, the current pulses drawn from the direct current supply are twice as large and occur half as often. Where a single capacitor is used, in the circuit of the invention, it must have twice the capacitance. It is preferable to employ two capacitors since the number of pulses drawn from the direct current supply are doubled and the demands on the power source are not as stringent.

Representing the resistive or power consuming portion of the load is a resistor 23, which is shown connected to a pair of output terminals connections 24, 25, an inductor 26 is connected in series with the resistor 23. It will be appreciated that the inductance provided by the inductor 26 may not be required in the circuit or may be eliminated in part if the overall reactance of the load circuit is inductive. A shunting resistor 27 and capacitor 28 may be connected in circuit across the inductor 26 to minimize the effect of any transient voltages. It was found that the resistor 27 and capacitor 28 were not required when the inverter circuit of the invention was used to provide a high frequency alternating current supply to a fluorescent lamp load.

The controlled rectifiers 11, 12 are fired by unijunction transistors 27, 28 of relaxation oscillators 29, 31, respectively, which, as shown in FIGS. 1 and 4, are enclosed by the rectangles formed by dashed lines. The unijunction transistors 27, 28 have base-one ohmic contacts 32, 33, base-two ohmic contacts 34, 35 and emitters 36, 37, respectively.

The relaxation oscillator 29 includes the unijunction transistor 27, a resistor 38 connected in circuit with base-one contact 32, a resistor 39 connected in circuit with the base-two contact 34, a serially connected resistor 41 and a capacitor 42 which are joined at a junction 43 connected to the emitter 36. The relaxation oscillator 31 has the same general circuit configuration as oscillator 29 and includes a resistor 44 connected in circuit with the base-one contact 33, a resistor 45 connected in circuit with the base-two contact 35, a serially connected resistor 46 and capacitor 47 which are joined at a junction 48 connected to the emitter 37 of the unijunction transistor 28. The resistors 39, 45 are provided to limit the base-two to base-one transistor current in the relaxation oscillators 29, 31 to the capabilities of the unijunction transistors 27, 28.

A transformer 49 has the isolated primary windings 51, 52 and the isolated secondary windings 53, 54, which couple the relaxation oscillators 29, 31 with the controlled rectifiers 11, 12, respectively. The transformer 49 provides direct current isolation of the relaxation oscillators 29 and 31 and an alternating current coupling with the gate circuits of the controlled rectifiers 11 and 12. Further, it is to be noted that when oscillator 29 supplies a voltage pulse to primary winding 51, a positive gate current is supplied to controlled rectifier 12. The polarity of the voltage induced in secondary winding 53 by the same voltage pulse from oscillator 29 is such that it would supply a negative gate current to controlled rectifier 11 except for the blocking action of diode 55. Thus, a positive pulse is supplied to gate 22 of controlled rectifier 12 while no current flows to the gate 21 of the controlled rectifier 11. Similarly, when a voltage pulse is supplied by oscillator 31 to the primary winding 52, a positive gate current is supplied by winding 53 to controlled rectifier 11 while negative gate current to controlled rectifier 12 is blocked by diode 56. Under this condition of the circuit, only controlled rectifier 11 is triggered.

Diodes 55, 56 are provided in the gate circuits of controlled rectifiers 11, 12, respectively, to prevent inverse voltage from being applied between cathode and gate during the reverse part of the cycle. Diode 57 is connected in circuit with the capacitor 42 of relaxation oscillator 29 to block negative current flow through the oscillator 29. Similarly, diode 58 is connected in circuit with the capacitor 47 to block negative current flow through the relaxation oscillator 31.

In order to start the inverter circuit shown in FIG. 1, a resistor 59 and a capacitor 60 are connected in circuit with the positive input terminal 13 and the gate electrode 22 of silicon controlled rectifier 12. The inverter circuit shown in FIG. 4 employs an auxiliary direct current power source 60, such as a battery, to provide the initial capacitor charge required to initially trigger the controlled rectifier 12. The auxiliary power source 60 is connected in circuit with an isolating resistor 61, a switching means 62, a second resistor 63, a junction 66 of two serially connected capacitors 64, 65 and diode 58 which permits positive current flow to the relaxation oscillator 31. The resistor 61 limits the starting circuit current to a few milliamperes and provides sufficient resistance to render the auxiliary power source 60 ineffective after the circuit is started. As shown in FIG. 4, the switching means 62 is a single throw switch.

Figure 2:
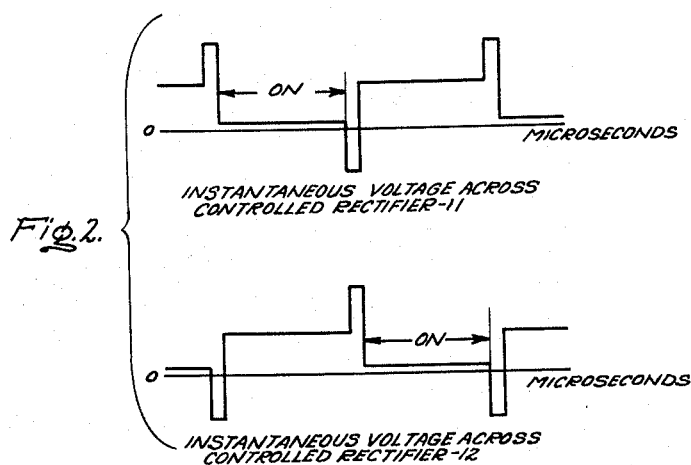
FIG. 2 is an illustration of the waveforms of the instantaneous voltage across the controlled rectifiers.

The resistor 63 and the capacitors 64, 65 are provided in the circuit illustrated in FIG. 4 to reduce the rate of rise of the square wave voltage that is impressed across the relaxation oscillators 29, 31. The waveform of the voltage that appears across the controlled rectifiers 11, 12 and the relaxation oscillators 29, 31 is illustrated in FIG. 2. I have found that the reliability of the firing circuit was improved with the resistor 63 and the two capacitors 64, 65 in the circuit because of their effectiveness in eliminating transient voltage spikes that otherwise appear in the gate circuits because of the fast rate of rise of the commutation voltage.

Across the primary windings 51, 52 of the transformer 49 as shown in FIG. 4, I have provided capacitors 67, 68, respectively. The purpose of the capacitors 67, 68 is to further reduce transient voltages that might otherwise lead to untimely triggering of controlled rectifiers 11 and 12. I have also found that a capacitor 69 connected across the input terminals 13, 14 will provide a low impedance path for the high frequency components of the D.C. supply current. If the capacitor 69 is not connected in the circuit, the high frequency components must be passed through the 60 cycle alternating current supply where such a supply source is used in conjunction with a rectifier to energize the inverter circuit of the present invention.

The operation of the inverter circuits shown in FIGS. 1 and 4 will now be described. It is to be understood that the inverter circuits must first be started. Different starting circuit means are employed in the two illustrative embodiments of the invention. The inverter circuit of FIG. 1 is started by energizing the input terminals 13, 14 with a direct current supply of the polarity indicated. This results in a voltage across the capacitors 15, 16 and in a single spike of current to flow through the resistor 59, the capacitor 60, the diode 56 and to the gate electrode 22 of the controlled rectifier 12, thereby turning the controlled rectifier 12 on. The inverter circuit of FIG. 1 is now started.

In order to start the inverter circuit shown in FIG. 4, the main direct current source is connected with the input terminals 13, 14 and the auxiliary power source 60 is energized, with the switch 62 in the open position. When the switch 62 is in the open position, the relaxation oscillators 29 and 31 are not energized. The capacitors 15, 16 are charged by the auxiliary voltage source 60 and thereby point B becomes positive with respect to point A. The magnitude of the positive potential across point A and point B is substantially equal to the voltage of the auxiliary power source 60. When switch 62 is closed, this positive potential appears across relaxation oscillator 29, and the normal operation of the inverter circuit shown in FIG. 4 commences. Thus, it is seen that the starting of the inverter circuit by impressing a positive potential across point A and B is analogous to the initiation of a vibration in a taut string by means of an initial displacement.

A principal advantage in the starting arrangement of the inverter circuit illustrated in FIG. 4 is that it can start the inverter circuit when the circuit Q is relatively low. If starting is accomplished by the means illustrated in FIG. 1, the inverter oscillation must build up from a relatively low oscillatory current to the running level as determined by the circuit Q. If the build-up is not fast enough, the commutation voltage at the end of the first half cycle may not be sufficient to drive relaxation oscillator 31 and the inverter will fail to start. For this reason, the starting mechanism of FIG. 1 has the limitation that the minimum circuit Q required for starting is appreciably higher than the minimum Q for running. This limitation is overcome by the starting circuit of FIG. 4 by virtue of the fact that the auxiliary power source 60 provides an initial charge to capacitor 16. This initial charge raises the level of the initial oscillatory current approximately to the running level so that no build-up is required. I have found that if the auxiliary power source 60 will provide a voltage equal to the maximum positive potential of point B with respect to point A during the normal operation of the circuit, the starting arrangement of FIG. 4 can initiate any oscillation that the inverter circuit is capable of maintaining. An auxiliary power source supplying 50 volts was actually employed in the inverter circuit.

Once the oscillations in the inverter circuits shown in FIGS. 1 and 4 are started, the normal operation of both circuits is essentially the same. It will be noted that the starting arrangement of the circuit shown in FIG. 4 is not effective in the inverter circuit during its normal operation because the series resistor 61 has sufficient resistance to isolate the auxiliary power source 60 from the inverter circuit.

The operation of the inverter circuits will now be described, starting with the condition of the circuit which prevails at the instant the current supplied to the load resistor 23 is zero in magnitude and a positive potential appears from point A to point B. This positive potential also appears across relaxation oscillator 29, causing a charging current to flow to the capacitor 42. When the charge on capacitor 42 reaches the peak point voltage of the unijunction transistor 27, the transistor 27 assumes its negative resistance characteristic causing the capacitor 42 to discharge. The discharge current of capacitor 42 produces a voltage pulse across the resistor 41. This pulse appears in the primary winding 51 of the coupling transformer 49. This voltage pulse is coupled to secondary 54, which supplies a positive current pulse to the gate 20 of controlled rectifier 12, and the controlled rectifier 12 is turned on. Since the controlled rectifier 12 is now in a conducting state and controlled rectifier 11 is in a blocking state, the capacitors 15, 16 are discharged and current flows through the resistor 23, the inductor 26, point B, the controlled rectifier 12 and the terminal 14. It is to be understood that the surge of current through the inductor 26, the resistor 23 and the capacitors 15, 16 will cause an oscillatory condition in the circuit, provided the ohmic resistance of the load resistor 23 is small as compared with the inductance of the inductor 26. It is necessary in the practice of the present invention that the ratio of the ohmic resistance of the load to the inductance of inductor 26 be sufficiently small that the voltage of point B will turn negative with respect to point C by the end of the first half cycle. This is to say that the circuit Q must be sufficiently high to sustain oscillation. It is a further requirement in the practice of this invention that the magnitude of this negative voltage swing (point B with respect to point C) be sufficient to drive relaxation oscillator 31. The required magnitude is approximately 25 volts in the hereinafter described exemplification of the invention.

At the end of the first half cycle, the current through controlled rectifier 12 goes to zero and would then begin to build up in the opposite direction in the oscillatory fashion of the LRC (R denoting resistance, L inductance and C capacitance) tuned circuit. The controlled rectifier 12, however, will not pass current in the reverse direction, and the full voltage to which capacitor 16 has been charged now appears as a commutation voltage across controlled rectifier 12. If the circuit Q is sufficiently high, point B is now negative with respect to point C, and current flows from point C through resistor 46, capacitor 47, diode 58 and back to point C, charging capacitor 47. The RC time constant of relaxation oscillator 31, as determined by the resistance of resistor 46 and the capacitance of the capacitor 47, allows sufficient recovery time for controlled rectifier 12 before unijunction transistor 28 triggers the controlled rectifier 11. It is desirable that at least 20 microseconds be provided to insure that the controlled rectifier 12 has returned to its blocking state before controlled rectifier 11 is fired.

When the charge on the capacitor 47 reaches the peak point voltage of the unijunction transistor 28, the transistor 28 assumes its negative resistance characteristic causing the capacitor 47 to discharge. The discharge current of capacitor 47 produces a pulse in the primary winding 52 of transformer 49 and thereby a positive current flow is induced in the secondary winding 53 which flows into gate electrode 21 and triggers the controlled rectifier 11. Thus, when controlled rectifier 11 is triggered, the second half cycle is initiated and current now flows from the positive input terminal 13 through the controlled rectifier 11, point B, the inductor 26, the resistor 23 and the capacitors 15, 16 which are charged during this portion of the cycle. Due to the oscillatory nature of the circuit, by the end of the second half cycle, point B has turned positive with respect to the point A and a charging current again flows in the relaxation oscillator 29. When the charge on the capacitor 42 reaches the peak point voltage of the unijunction transistor 27, the transistor 27 assumes its negative characteristic causing the capacitor 42 to discharge and fire controlled rectifier 12 to begin another cycle.

In FIG. 2 the waveforms are shown for the instantaneous voltage across controlled rectifiers 11 and 12. It will be noted that during the interval that controlled rectifier 11 is in a conducting state, a positive voltage appears across the controlled rectifier 12. However, diode 58 blocks this positive voltage from causing any current flow through the capacitor 47 and resistor 46 of the relaxation oscillator 28. The commutation period of the controlled rectifier 11 commences with a sharp reversal of voltage across the controlled rectifier 11. It is to be noted that during the commutation period of controlled rectifier 11 a negative voltage appears across rectifier 11 indicating that point B of the circuit shown in FIGS. 1 and 4 is negative with respect to point A. Thus, it will be appreciated that relaxation oscillator 29 is energized only during the commutation period of the controlled rectifier 11. Also, it will be seen from the voltage curves that during the time controlled rectifier 12 is conducting, a positive voltage appears across controlled rectifier 11 which is approximately equal to the voltage of the direct current supply connected across the terminals 13, 14. This positive voltage is blocked from the relaxation oscillator circuit 29 by the diode 57.

After controlled rectifier 12 has been cut off, the commutation voltage causes point B to become negative with respect to point C. As was previously mentioned, this voltage causes a current to flow through the resistor 46 and capacitor 47 of relaxation oscillator 31 and approximately 20 microseconds later capacitor 47 is charged to the peak point voltage of the unijunction transistor 28 and controlled rectifier 11 is fired. A significant advantage in the use of this arrangement is that the relaxation oscillator circuits 29, 31 are energized only during the commutation period of the controlled rectifiers 11, 12, thereby positively assuring that the controlled rectifiers 11, 12 will not be fired simultaneously.

Figure 3:
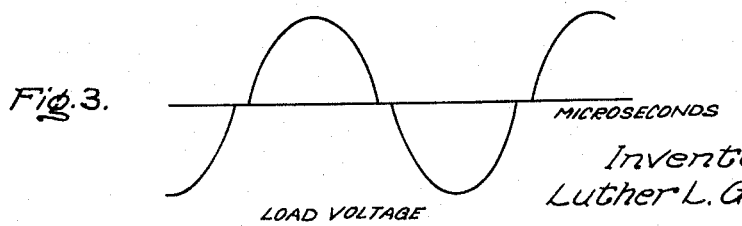
FIG. 3 shows a somewhat idealized waveform of the voltage at the load terminals.

In FIG. 3 the waveform of the voltage appearing across the output terminals 24 and 25 is shown. It will be noted that during the commutation period in each half cycle, the voltage is at a zero level. However, the waveform of the load voltage is substantially sinusoidal.

The circuit illustrated in FIG. 4 was tested and operated to supply alternating current at a frequency of 1,540 cycles per second from a 67 volt direct current supply. The following constants of the principal circuit components are cited by way of example and are not intended to limit the invention in any way:

| | |
|---|---|
| Capacitors 15, 16 | 21.6 microfarads. |
| Silicon controlled rectifiers 11, 12 | General Electric Silicon Controlled Rectifier ZJ39A–150. |
| Diodes 55, 56, 57, 58 | General Electric 1N93 diode. |
| Transformer 49 | Small coupling transformer with a 1:1 turns ratio. |
| Capacitors 67, 68 | .01 microfarad. |
| Resistors 38, 44 | 150 ohms. |
| Resistors 39, 45 | 470 ohms. |
| Resistors 41, 46 | 2200 ohms. |
| Capacitors 42, 47 | .01 microfarad. |
| Unijunction transistors 27, 28 | GE unijunction transistor 2N489. |
| Capacitors 64, 65 | 0.1 microfarad. |
| Resistor 63 | 10 ohms. |
| Resistor 61 | 27,000 ohms. |
| Capacitor 69 | 70 microfarads. |
| Auxiliary power source 60 | 50 volts direct current supply. |
| Inductor 26 | Arnold Engineering AL14 "C" core with an 80 mil gap in each leg. |

The winding of inductor 26 consisted of four separate coils connected in parallel, two per leg each comprising 50 turns of .0471 inch wire.

The voltage applied at the input terminals 13, 14 was 67 volts and was obtained from a three-phase full wave bridge rectifier. With the foregoing components, the inverter circuit provided an alternating voltage at the terminals 24, 25 having a root mean square voltage of 23.2 volts at a current of 19.7 amps and a frequency of 1,540 cycles per second.

It will be understood that the various specific circuits which have been described herein are intended as illustrative examples of the invention and that the invention is not limited to such examples. Further, it will be apparent that many modifications of the particular embodiments of the invention described herein may be made. It is to be understood, therefore, that I intend by the appended claims to cover all such modifications that fall within the true spirit and scope of the invention.

What I claim as new and desire to secure by Letters Patent of the United States is:

1. An inverter circuit comprising a pair of direct current input terminals, a capacitor connected in circuit with said input terminals, a pair of controlled rectifiers, a load circuit having a resistive portion and an inductive portion, means connecting said input terminals with said controlled rectifiers and said load circuit to provide a current path for energizing said load circuit with half cycles of current flow of opposite direction, said capacitor being charged and discharged during each cycle; a first firing circuit means connected in circuit with said second controlled rectifier to provide a current pulse to fire said second controlled rectifier after a predetermined delay; a second firing circuit means connected in circuit with said first controlled rectifier to provide a current pulse to fire said first controlled rectifier after a predetermined delay, said first firing circuit means being connected across said first controlled rectifier and energized only by reverse voltage appearing during commutation of said first controlled rectifier and said second firing circuit means being connected across said second controlled rectifier and energized only by reverse voltage appearing during commutation of said second controlled rectifier; and means for initially triggering one of said controlled rectifiers to start the operation of said inverter circuit.

2. An inverter circuit comprising: a pair of direct current input terminals; a capacitor connected in circuit with said input terminals; an inductor; a load circuit connected with said capacitor and inductor; a first and second controlled rectifier connected in circuit with said input terminals, capacitor, inductor and load circuit so as to alternately charge and discharge said capacitor through said inductor and load circuit; means for initially firing one of said controlled rectifiers when said input terminals are energized; a first firing circuit means connected in circuit with said second controlled rectifier to provide a pulse of current to fire said second controlled rectifier; a second firing circuit means connected in circuit with said first controlled rectifier to provide a pulse of current to fire said first controlled rectifier, said first firing circuit being connected across said first controlled rectifier and energized only by the reverse voltage appearing across said first controlled rectifier during its commutation period, said second firing circuit means being connected across said second controlled rectifier and energized only by the reverse voltage appearing across the second controlled rectifier during its commutation period, and said first and second firing circuit means providing sufficient time delay to permit one of the controlled rectifiers being switched off to return to a blocking state before the other of said controlled rectifiers is fired, thereby preventing said first and second controlled rectifiers from being simultaneously fired by said first and second firing circuit means.

3. An inverter circuit comprising: a pair of direct current input terminals; a capacitor, an inductor and a load connected in circuit with said input terminals; a first controlled rectifier and a second controlled rectifier connected in circuit with said input terminals to alternately charge and discharge said capacitor through said inductor and load; a pair of output terminals, one of said output terminals being connected in circuit with said capacitor and said inductor and the other of said output terminals being connected in circuit with said first and second controlled rectifiers, said output terminals being adapted to provide an alternating current supply when said input terminals are energized by a direct current power supply; a first firing circuit means connected in circuit with said second controlled rectifier to provide a current pulse to fire said second controlled rectifier after a predetermined delay; a second firing circuit means connected in circuit with said first controlled rectifier to provide a current pulse to fire said first controlled rectifier after a predetermined delay, said first firing circuit means being energized by the commutation voltage of said first controlled rectifier and said second firing circuit means being energized by the commutation voltage of said second controlled rectifier; and means for initially triggering one of said controlled rectifiers to start the operation of said inverter circuit.

4. An inverter circuit comprising: a pair of direct current input terminals; a pair of serially connected capacitors connected in circuit across said input terminals; an inductor connected in circuit with said input terminals and said capacitor; a first controlled rectifier having an anode, a cathode and a gate; a second controlled rectifier having an anode, a cathode and a gate, said first and second controlled rectifiers being connected in series circuit relationship to alternately cause said capacitors to charge and discharge through said inductor; a pair of output terminals, one of said output terminals being connected in circuit with said capacitors and said inductor and the other of said output terminal connections being connected in circuit with the cathode of one of said controlled rectifiers and the anode of the other of the said controlled rectifiers, said output terminals being adapted to provide an alternating current supply when said input terminals are energized from a direct current power supply; a first firing circuit means connected in circuit with said first controlled rectifier and the gate of said second controlled rectifier; a second firing circuit means connected in circuit with said second controlled rectifier and the gate of said first controlled rectifier, said first firing circuit means being energized by the voltage appearing across said first controlled rectifier during its commutation period and supplying a current pulse to fire said second controlled rectifier after a predetermined delay sufficient to permit said first controlled rectifier to return to a blocking state and said second firing circuit means being energized by the voltage appearing across said second controlled rectifier during its commutation period and supplying a current pulse to fire said first controlled rectifier after a predetermined delay sufficient to permit said second controlled rectifier to return to a blocking state; and a starting means for initially firing one of said controlled rectifiers to start the operation of said inverter circuit.

5. An inverter circuit as set forth in claim 4 in which said starting means comprises: a serially connected capacitor and resistor in circuit with the gate of one of said controlled rectifiers and one of said input terminals.

6. An inverter circuit comprising: a pair of direct current input terminals; at least one capacitor connected in circuit with said input terminals; an inductor connected in circuit with said capacitor and said input terminals; a pair of controlled rectifiers, each of said controlled rectifiers having an anode, a cathode and a gate electrode, the anode of one of said controlled rectifiers being connected in circuit with one of said input terminals and the cathode of the other of said controlled rectifiers being connected in circuit with the other of said input terminals; a pair of output terminals, one of said output terminals being connected in circuit with at least one of said capacitors and said inductor and the other of said output terminals being connected in circuit with the cathode of one of said controlled rectifiers and the anode of the other of said controlled rectifiers, said output terminals being adapted to provide an alternating current supply; a first firing circuit means being connected in circuit with said first controlled rectifier and the gate of said second controlled rectifier, said first firing circuit means being energized by the voltage appearing across said first controlled rectifier during its commutation period in order to fire the second controlled rectifier after a predetermined delay; a second firing circuit means connected in circuit with said second controlled rectifier and the gate electrode of said first controlled rectifier, said second circuit firing means being energized during the commutation period of said second controlled rectifier to fire said first controlled rectifier after a predetermined delay; and means for providing a pulse of current through one of said controlled rectifiers in order to initiate the operation of the circuit.

7. An electronic apparatus for converting a direct current power source to an alternating current supply comprising: a pair of direct current input terminals; a pair of capacitors serially connected at a junction and connected in circuit with said input terminals; an inductor connected in circuit with the junction of said capacitors; a first controlled rectifier having an anode, a cathode and a gate electrode; a second controlled rectifier having an anode, a cathode and a gate electrode; said first and second controlled rectifiers being connected in series circuit relationship so as to alternately charge and discharge said capacitors through said inductor; a first output terminal connected in circuit with said capacitors and said inductor; a second output terminal connected in circuit with said controlled rectifiers, said output terminals being adapted to provide an alternating current supply; a first firing circuit means; a second firing circuit means; a transformer having a first primary winding connected in circuit with said first firing circuit means to receive a current pulse, a second primary winding connected in circuit with said second firing circuit means to receive a current pulse;

a first secondary winding connected in circuit with said gate electrode of said first controlled rectifier and a second secondary winding connected in circuit with the gate electrode of said second controlled rectifier, said primary and secondary windings being so arranged that when a current pulse appears in said first primary winding a negative voltage is coupled to the gate of said first controlled rectifier by said first secondary winding and a positive voltage is coupled to the gate of said second controlled rectifier by said second secondary winding and when a firing pulse appears in said second primary winding a positive voltage is coupled to the gate of said first controlled rectifier by said first secondary winding and a negative voltage is coupled to the gate of said second controlled rectifier by said second secondary winding, said first controlled rectifier being fired by a pulse appearing in said second primary winding supplied by said second firing circuit means in response to the commutation voltage of said second controlled rectifier and said second controlled rectifier being fired by the current pulse appearing in said first primary winding in response to the commutation voltage of said first controlled rectifier; and means for providing a current pulse to one of said controlled rectifiers in order to initiate the operation of the circuit.

8. An electronic apparatus as set forth in claim 7 in which a diode is connected in series circuit relationship with said gate electrode of each of said controlled rectifiers to block negative current flow to said gate electrode.

9. An electronic apparatus for converting a direct current power source into an alternating current supply comprising: a pair of direct current input terminals; at least one capacitor connected in circuit with said input terminals; an inductor connected in circuit with said input terminals and said capacitor; a first controlled rectifier having an anode, a cathode and gate electrode; a second controlled rectifier having an anode, a cathode and a gate electrode, said first and second controlled rectifiers being serially connected in circuit with said input terminals; a pair of output terminals for providing an alternating current supply, one of said output terminals being connected in circuit with said capacitor and the other of said output terminals being connected in circuit with the cathode of said first controlled rectifier and the anode of said second controlled rectifier; a first firing circuit means connected in circuit with said first controlled rectifier and the gate of said second controlled rectifier; a second firing circuit means connected in circuit with said second controlled rectifier and said gate electrode of said first controlled rectifier; circuit means connecting said first and second firing circuit means with the anode and cathode electrodes of said controlled rectifiers so that said first circuit firing means fires said second controlled rectifier after a fixed delay at the end of the commutation period of said first controlled rectifier and said second firing circuit means fires said first controlled rectifier after a fixed delay after the end of the commutation period of said second controlled rectifier, thereby insuring against both of said controlled rectifiers being fired simultaneously; and means for initiating the operation of said apparatus comprising an auxiliary direct current power source, an isolating resistor and a switching means connected with said resistor and one of said firing circuit means, whereby when said switching means is closed, the voltage of said auxiliary power supply is applied to said firing circuit means causing said firing circuit means to fire one of said controlled rectifiers in order to start the operation of the circuit, said isolating resistor excluding said auxiliary power source from the circuit during its normal operation.

10. An electronic apparatus as set forth in claim 9 in which said auxiliary power source supplies a voltage approximately equal to the maximum commutating potential that appears across one of said controlled rectifiers during its normal operation.

11. An electronic apparatus for converting a direct current to an alternating current comprising: a pair of direct current input terminals, at least one capacitor connected across said input terminals; an inductor connected in circuit with said capacitor; a first and a second controlled rectifier, each having an anode, a cathode and gate electrode, the anode of said first controlled rectifier being connected in circuit with one of said input terminals and the cathode of the second controlled rectifier being connected in circuit with the other of said input terminals; a pair of output terminals for providing an alternating current supply, one of said output terminals being connected in circuit with said capacitor and the other of said output terminals being connected in circuit with the cathode of said first controlled rectifier and the anode of said second controlled rectifier; a first relaxation oscillator having a unijunction transistor and a serially connected resistor and capacitor; a second relaxation oscillator having a unijunction transistor and a serially connected resistor and capacitor; a transformer having a first and a second primary winding and a first and a second secondary winding, said first primary winding being connected in circuit with said first relaxation oscillator to receive a current pulse from the said first oscillator and said first secondary winding being connected in circuit with said gate of said first controlled rectifier, said second primary winding being connected in circuit with said second relaxation oscillator to receive a current pulse from said second oscillator and said second secondary being connected in circuit with said gate electrode of said second controlled rectifier; a first circuit means connecting said first relaxation oscillator in circuit with said controlled rectifiers so that said first relaxation oscillator is energized by the reverse commutation voltage of said first controlled rectifier and after a fixed delay fires said second controlled rectifier; a second circuit means connecting said second relaxation oscillator in circuit with said controlled rectifiers so that said second relaxation oscillator is energized by the reverse commutation voltage of said second controlled rectifier and after a fixed delay fires said first controlled rectifier; and means for providing a pulse of current through the gate electrodes of one of said controlled rectifiers in order to initiate operation of said apparatus.

References Cited in the file of this patent

UNITED STATES PATENTS

| 1,834,889 | Bedford | Dec. 1, 1931 |
| 1,929,720 | Willis | Oct. 10, 1933 |
| 1,947,093 | Knowles | Feb. 13, 1934 |
| 1,967,876 | Fecker | July 24, 1934 |
| 1,988,947 | Hintze | Jan. 22, 1935 |
| 2,179,366 | Willis | Nov. 7, 1939 |
| 2,220,077 | Coffin | Nov. 5, 1940 |
| 2,475,621 | Klemperer | July 12, 1949 |
| 2,523,094 | Carleton | Sept. 19, 1950 |
| 2,850,832 | Kruetzer | Sept. 9, 1958 |

OTHER REFERENCES

"Notes on the Application of the Silicon Controlled Rectifier," published by the Semiconductor Products Dept. of General Electric Company, Application Engineering, December 1958.